US009020417B2

(12) United States Patent  (10) Patent No.: US 9,020,417 B2
So et al.  (45) Date of Patent: Apr. 28, 2015

(54) COMMUNICATION SYSTEM AND COMMUNICATION METHOD USING RELAY TERMINALS

(75) Inventors: Jung Min So, Suwon-si (KR); Ki-Sun Oh, Gunpo-si (KR); Mi-Sun Do, Suwon-si (KR); Hee Jung Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1504 days.

(21) Appl. No.: 12/207,775

(22) Filed: Sep. 10, 2008

(65) Prior Publication Data

US 2009/0280797 A1  Nov. 12, 2009

(30) Foreign Application Priority Data

May 9, 2008 (KR) .......................... 10-2008-0043194

(51) Int. Cl.
*H04B 7/14* (2006.01)
*H04B 7/26* (2006.01)
*H04B 7/155* (2006.01)

(52) U.S. Cl.
CPC .......... *H04B 7/2606* (2013.01); *H04B 7/15592* (2013.01)

(58) Field of Classification Search
USPC .......... 455/7, 39, 11.1, 13.1, 422.1, 436–449, 455/452.2, 435, 16; 370/248–338, 395.21, 370/229, 230.1, 400
See application file for complete search history.

(56) References Cited

U.S. PATENT DOCUMENTS

| 7,742,452 B2 * | 6/2010 | Visotsky et al. .............. 370/331 |
| 8,010,041 B2 * | 8/2011 | Wang et al. ........................ 455/7 |
| 8,213,314 B2 * | 7/2012 | Chindapol et al. ............ 370/236 |
| 2004/0266339 A1 * | 12/2004 | Larsson ............................ 455/7 |
| 2007/0153758 A1 * | 7/2007 | Kang et al. ..................... 370/338 |
| 2008/0188177 A1 * | 8/2008 | Tan et al. ...................... 455/11.1 |
| 2008/0220790 A1 * | 9/2008 | Cai et al. ........................ 455/450 |
| 2008/0227461 A1 * | 9/2008 | Dayal et al. ................ 455/452.2 |
| 2008/0240018 A1 * | 10/2008 | Xue et al. ...................... 370/328 |
| 2009/0017753 A1 * | 1/2009 | Kim et al. ........................ 455/10 |
| 2009/0116419 A1 * | 5/2009 | Chong et al. .................. 370/312 |
| 2010/0027457 A1 * | 2/2010 | Okuda .......................... 370/315 |

FOREIGN PATENT DOCUMENTS

| JP | 2005-217548 | 8/2005 |
| KR | 10-2004-0060461 | 7/2004 |
| KR | 10-2005-0035025 | 4/2005 |
| KR | 10-2007-0074252 | 7/2007 |
| KR | 10-2007-0076696 A | 7/2007 |
| KR | 10-2007-0120875 A | 12/2007 |
| KR | 10-0782905 B1 | 12/2007 |

OTHER PUBLICATIONS

Korean Office Action issued Mar. 17, 2014 in counterpart Korean Patent Application No. 10-2008-0043194 (5 pages, in Korean).

* cited by examiner

*Primary Examiner* — Christopher M Brandt
(74) *Attorney, Agent, or Firm* — NSIP Law

(57) ABSTRACT

A communication system and a communication method using relay terminals are provided. A communication system includes a base station, a target terminal transmitting uplink data to the base station or receiving downlink data from the base station, and a plurality of relay terminals cooperatively relaying the uplink data/downlink data to the base station/target terminal, the plurality of relay terminals being grouped into at least one group.

28 Claims, 7 Drawing Sheets

FIG. 6
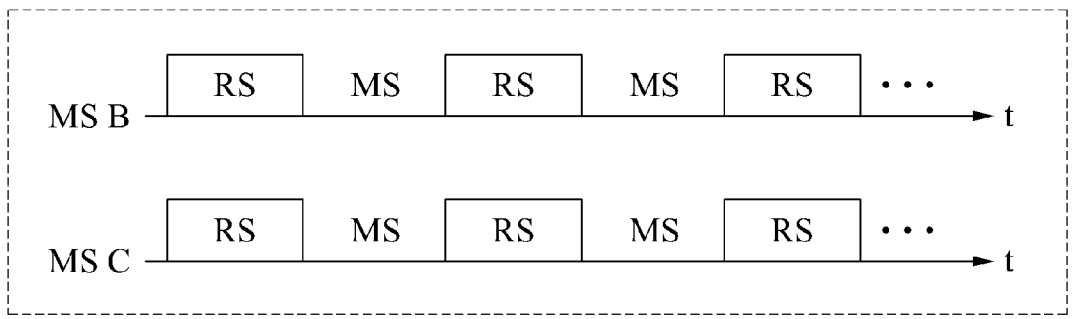
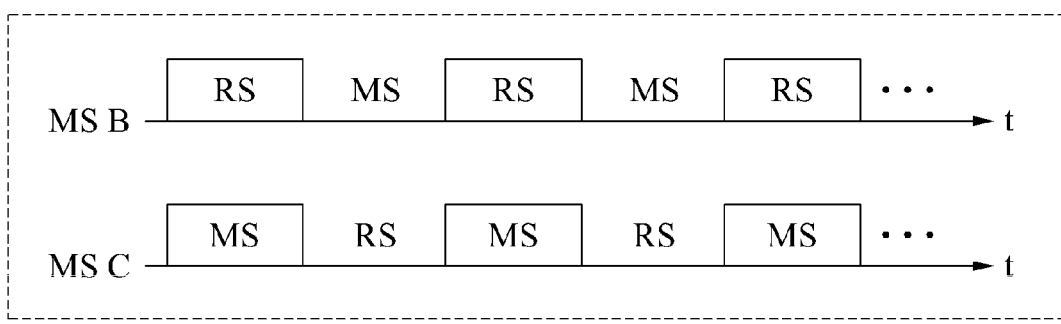
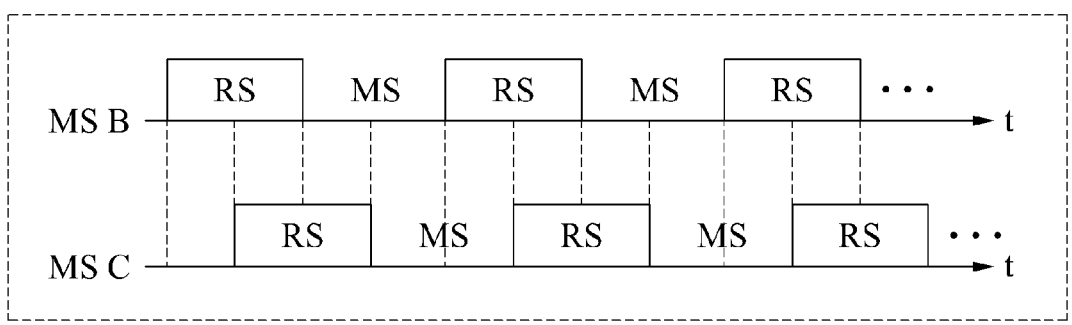

COMMUNICATION SYSTEM AND COMMUNICATION METHOD USING RELAY TERMINALS

CROSS-REFERENCE TO RELATED APPLICATION

This application claims the benefit under 35 U.S.C. §119(a) of a Korean Patent Application No. 10-2008-0043194, filed on May 9, 2008 in the Korean Intellectual Property Office, the entire disclosure of which is incorporated herein by reference.

TECHNICAL FIELD

The following description relates to a communication system, and more particularly, to extending cell coverage of base stations by using mobile stations performing as relay terminals, and to a technology for improving efficiency of a communication system.

BACKGROUND

Consumers continue to demand higher quality in communication. To satisfy the demand, wider frequency bands and higher frequency bands may be desirable.

Where a cellular communication system uses higher frequency bands, cell coverage may be reduced. Where the cell coverage is reduced, a greater number of infra-stations may be required. Also, even with the installation of numerous additional infra-stations, communication problems may still occur due to shadow areas.

Accordingly, a scheme for a cellular communication system which includes a relay station has been gaining attention. This is because relay stations may be more economic, and also, the amount of labor and costs associated for installing relay station may be relatively lower than base stations.

However, a relay station is another type of an infra-station and thus, still incurs costs for its installation. Furthermore, relay stations may not completely solve the shadow area problem. Also, since a general relay station is fixed to a particular location, there still exists a limit in extending the coverage of the general relay station.

SUMMARY

Accordingly, according to an aspect, there is provided a cellular communication system comprising a base station, a target terminal transmitting uplink data to the base station or receiving downlink data from the base station, and a plurality of relay terminals cooperatively relaying the uplink data/downlink data to the base station/target terminal, the plurality of relay terminals being grouped into at least one group.

The plurality of relay terminals may relay the uplink data/downlink data to/from the target terminal using a cellular frequency band.

The plurality of relay terminals may be adaptively grouped into at least one group based on a relaying ability capable of relaying the uplink data or the downlink data.

The plurality of relay terminals may be adaptively grouped into at least one group based on at least one of a number of the plurality of relay terminals, a moving speed, remaining power of the plurality of relay terminals, a traffic load to be loaded on the plurality of relay terminals and channel states formed between the plurality of relay terminals and the base station or between the plurality of relay terminals and the target terminals.

The plurality of relay terminals may relay the uplink data or the downlink data using scheduled time slots or frequency bands.

The plurality of relay terminals may transmit beacons representing existence of the plurality of relay terminals, and establish connection with the base station or the target terminal depending on a response from the base station or the target terminal corresponding to the beacons.

The plurality of relay terminals may transmit the beacons with a period which are adaptively controlled depending on the relaying ability capable of relaying the uplink data/the downlink data.

The beacons may comprise identification information or scheduling information of the plurality of relay terminals.

According to another aspect, there is provided a member relay terminal included in a group which consists of a plurality of relay terminals, the member relay terminal comprising a data receiving unit receiving downlink data/uplink data transmitted from a base station/target terminal, a data transmission unit transmitting the downlink data/uplink data to the base station/target terminal in cooperation with the plurality of relay terminals included in the group, and a connection establishment unit transmitting a beacon representing existence of the member relay terminal, and establishing connection with the base station/target terminal according to a response from the base station/target terminal corresponding to the beacon.

The member relay terminal may adaptively join the group or leave from the group according to a relaying ability capable of relaying the uplink data or the downlink data.

The data transmission unit may transmit the uplink data or the downlink data using scheduled time slots or frequency bands.

The time slots and the frequency bands may be scheduled by the base station or the plurality of relay terminals.

The scheduled frequency bands may be a portion of or all of a cellular frequency band.

The data transmission unit may transmit the uplink data or the downlink data in a time slot, which is identical to a time slot of transmitting the uplink data or the downlink data by at least one of the plurality of relay terminals.

The member relay terminal may further comprise a connection establishment unit transmitting a beacon representing existence of the member relay terminal, and establishing connection with the base station/target terminal according to a response from the base station/target terminal corresponding to the beacon.

The connection establishment unit may transmit the beacon with a period which is adaptively controlled depending on a relaying ability of the plurality of relay terminals or the member relay terminal capable of relaying the uplink data or the downlink data, and transmit the beacon.

According to still another aspect, there is provided a target terminal comprising a beacon reception unit receiving beacons transmitted from a plurality of relay terminals, a connection establishment unit establishing connection with a portion of or all of the plurality of relay terminals in response to the received beacons, and a data transmission/receiving unit receiving downlink data of a base station from the connected relay terminals, or transmitting uplink data to the connected relay terminals.

The beacons may comprise identification information of the plurality of the relay terminals, and the connection establishment unit may establish connection with a portion of or all of the plurality relay terminals based on the identification information of the plurality of relay terminals.

The beacons may be transmitted from the plurality of relay terminals with a period which are adaptively controlled depending on a relaying ability capable of relaying the uplink data/downlink data of the plurality of relay terminals.

The data transmission/receiving unit may receive the downlink data from the connected relay terminals or transmit the uplink data to the connected relay terminals, using a cellular frequency band.

According to still another aspect, there is provided a base station comprising a group management unit grouping a plurality of relay terminals, and managing the group, a scheduler scheduling time slots or frequency bands for the plurality of relay terminals included in the group, and a data transmission/receiving unit transmitting downlink data for a target terminal to the plurality of relay terminals included in the group, or receiving uplink data transmitted by the target terminal from the plurality of relay terminals.

The group management unit may enable at least one of the plurality of relay terminals to leave from the group, or enable a new relay terminal to join the group, based on a relaying ability capable of relaying the uplink data/downlink data.

The plurality of relay terminals included in the group may establish connection with the base station or the target terminal using beacons representing existence of the plurality of relay terminals, and the scheduler may control a transmission period of the beacons according to the relaying ability capable of relaying the uplink data or the downlink data.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 6 is a diagram illustrating operational modes with different timings for a plurality of relay terminals included in a single group according to an exemplary embodiment.

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
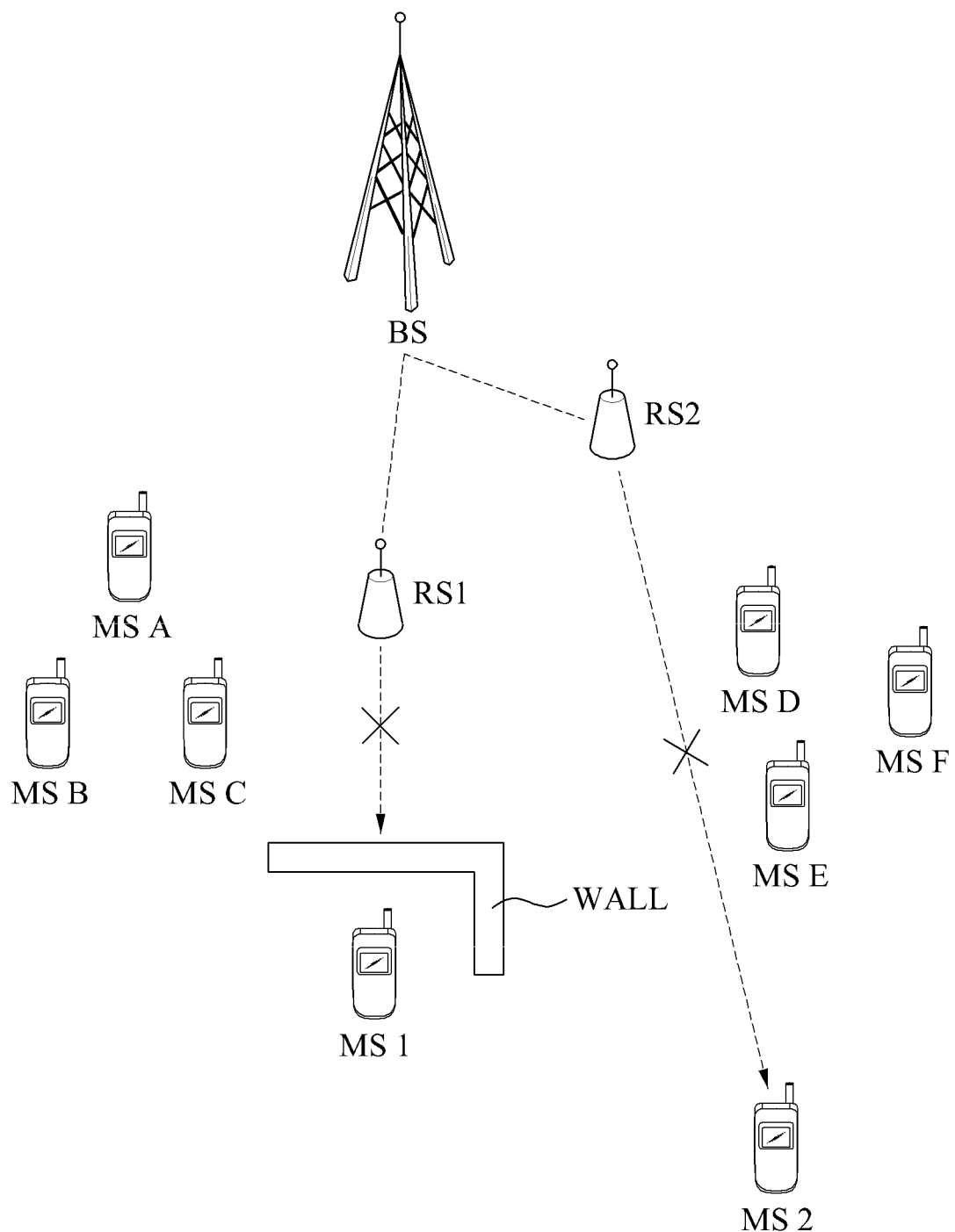
FIG. 1 is a diagram illustrating an exemplary cellular communication system which includes a plurality of relay stations and a plurality of mobile stations.

FIG. 1 illustrates an exemplary cellular communication system which includes a plurality of relay stations and a plurality of mobile stations.

In FIG. 1, it is assumed that a base station (BS) requests to communicate with a mobile station 1 (MS 1) and a mobile station 2 (MS 2). In FIG. 1, the MS 1 and MS 2 are referred to as a target terminal 1 (MS 1) and a target terminal 2 (MS 2). Conceptually, 'terminal' herein may include both mobile terminals and fixed terminals.

MS A, MS B, MS C, and MS D are closely located to relay terminals (RS 1 and RS 2) or to the BS, therefore the MS A, MS B, MS C, and MS D may be capable of smoothly transmitting uplink data to the BS and receive downlink data from the BS.

Due to the existence of a 'wall', the target terminal 1 (MS 1) is located in a shadow area of cell coverage. That is, the target terminal 1 (MS 1) may be incapable of receiving downlink data from the RS 1 or from the BS, and also may be incapable of transmitting uplink data to the RS 1 or to the BS.

Since the target terminal 2 (MS 2) is also located far from the BS or RS 2, target the terminal 2 (MS 2) may be incapable of receiving downlink data from the RS 2 or from the BS, and may be incapable of transmitting uplink data to the RS 2 or to the BS.

Where the MS A, MS B, and MS C perform as relay stations and relay download data/uplink data to the BS or to the target terminal 1 (MS 1), the target terminal 1 (MS 1) may be able to normally communicate with the BS. Likewise, where the MS D, MS E, and MS F perform as relay stations, the target terminal 2 (MS 2) may also be able to normally communicate with the BS.

However, for MS A, MS B, MS C, MS D, MS E, and MS F to perform as relay stations, there may be various problems. For example, the MS A, MS B, MS C, MS D, MS E, and MS F may have limited electrical power since the MS A, MS B, MS C, MS D, MS E, and MS F may be mobile stations with limited battery power capacity. Also, since traffic load to be placed on the MS A, MS B, MS C, MS D, MS E, and MS F may be limited, and since a link state for each of the MS A, MS B, MS C, MS D, MS E, and MS F may change over time, the MS A, MS B, MS C, MS D, MS E, and MS F may not be suitable as relay stations.

Consequently, for MS A, MS B, MS C, MS D, MS E, and MS F to operate as relay stations, the above described limited conditions, or a scheme which may adequately overcome the limitation elements may be desirable. A cellular communication system according to an exemplary embodiment may overcome one or more of the above described limited conditions, or limitation elements, as described below.

Figure 2:
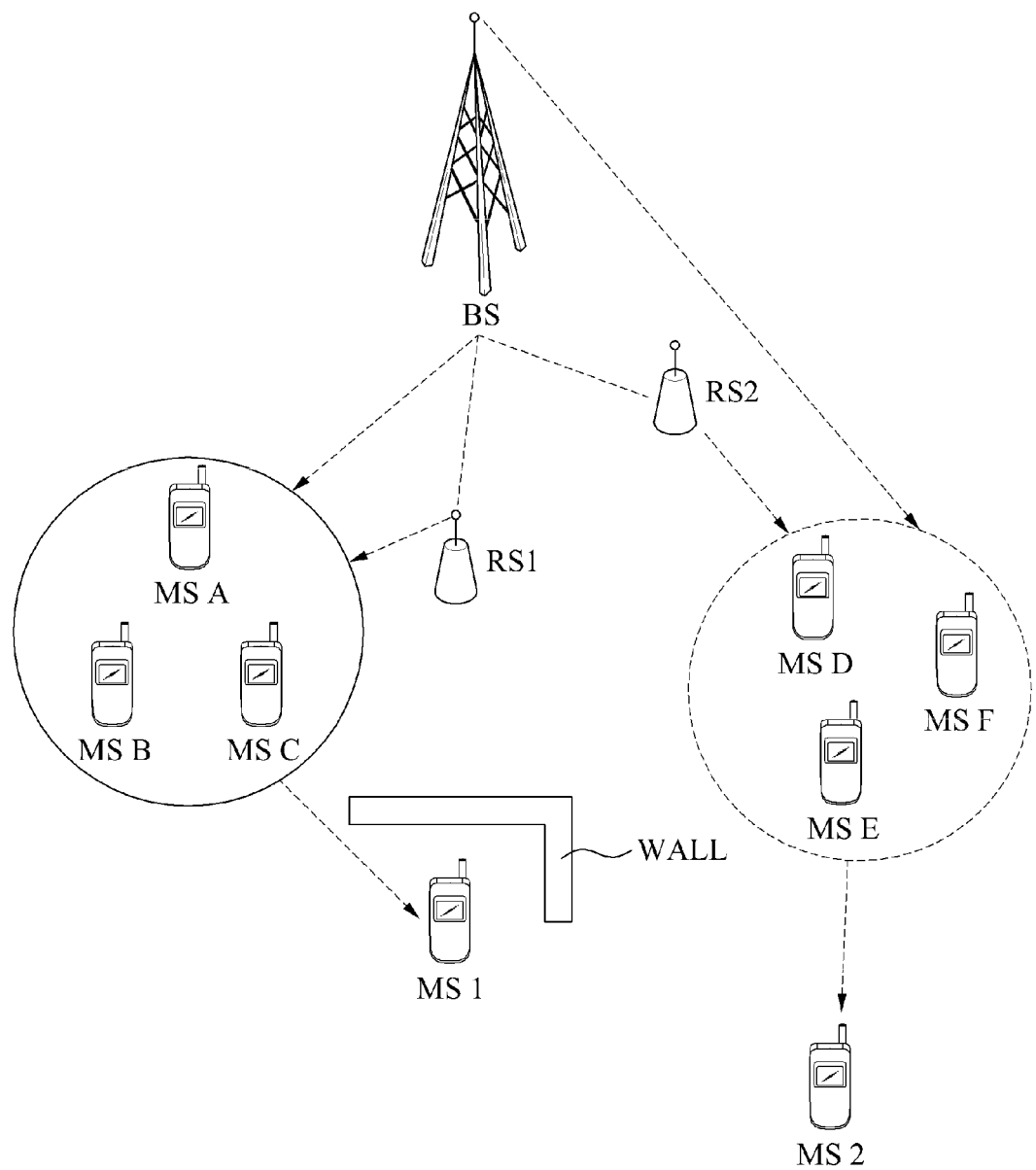
FIG. 2 is a diagram illustrating a cellular communication system which includes a plurality of relay terminals being grouped, a base station, and a target terminal according to an exemplary embodiment.

FIG. 2 illustrates a cellular communication system which includes a plurality of relay terminals being grouped, a base station, and a target terminal according to an exemplary embodiment.

Referring to FIG. 2, in the cellular communication system, a BS communicates with a target terminal 1 (MS 1) and a target terminal 2 (MS 2) using a group consisting of MS A, MS B, and MS C and a group consisting of MS D, MS E, and MS F. Herein, the MS A, MS B, MS C, MS D, MS E, and MS F are relay terminals.

The MS A, MS B, and MS C are included in an identical group and may perform as relay stations. The MS A, MS B, and MS C may relay downlink data transmitted from the BS to the target terminal 1 (MS 1), and also may relay uplink data transmitted from the target terminal 1 (MS 1) to the BS. Here, the MS A, MS B, and MS C may receive downlink/uplink data from a RS 1 as well as from the BS and from the target terminal 1 (MS 1), and the MS A, MS B, and MS C may relay downlink data/uplink data to the BS or to the target terminal 1 (MS 1).

Likewise, the MS D, MS E, and MS F may relay uplink data of the target terminal 2 (MS 2) to the BS or to a RS 2, and relay downlink data of the BS or RS 2 from the BS or from the RS 2 to the target terminal 2 (MS 2).

Accordingly, the cellular communication system according to an exemplary embodiment may solve a shadow area problem by using a plurality of mobile stations performing as relay stations and may overcome the limitation of cell coverage.

Also, since a plurality of mobile stations perform as relay stations, even in a case where a portion of relay terminals are unable to perform as relay stations, other relay terminals may normally perform as relay stations. Therefore, problems associated with mobile stations performing as relay stations may be solved.

As an example, in the case where the MS A has consumed all of its electric power, in the case a link state of the MS A has degraded due to moving at a high speed by the MS A, or in the case where the MS A has moved far away from the BS or from the target terminal 1 (MS 1), the MS B and MS C may perform as relay stations. Therefore, since the MS B and MS C may perform as relay stations even where MS A is not performing as a relay station, the BS and the target terminal 1 (MS 1) may normally transmit/receive downlink/uplink data.

Also, the MS A, MS B, and MS C or MS D, MS E, and MS F may relay uplink/downlink data using a cellular frequency band.

In this case, necessary wireless resources required by the MS A, MS B, and MS C or MS D, MS E and, MS F for relaying uplink/downlink data may be scheduled by various entities. As an example, the BS may perform scheduling of the above wireless resources or the MS A, MS B, and MS C or MS D, MS E, and MS F may perform scheduling of the above wireless resources by themselves. As an illustration, the wireless resources may include time resources, frequency resources, and code resources.

Furthermore, time slots of the MS A, MS B, and MS C or MS D, MS E, and MS F relaying uplink data/downlink data, or time slots for the MS A, MS B, and MS C or MS D, MS E, and MS F to perform as relay stations may be determined by various schemes.

The time slot of the MS A, MS B, and MS C performing as relay stations may be referred to as MS A, MS B, and MS C operating in a 'relay station mode'. The MS A, MS B, and MS C may operate in a 'relay station mode' in different time slots or in an identical time slot.

In a case where the MS A, MS B, and MS C are operating in a 'relay station mode' in an identical time slot, quality and the reliability of downlink data/uplink data relayed by the MS A, MS B can MS C may be improved.

Grouping which consists of MS A, MS B, and MS C or grouping which consists of MS D, MS E and MS F, and updating mobile stations included in the above groups are explained below.

Figure 3:
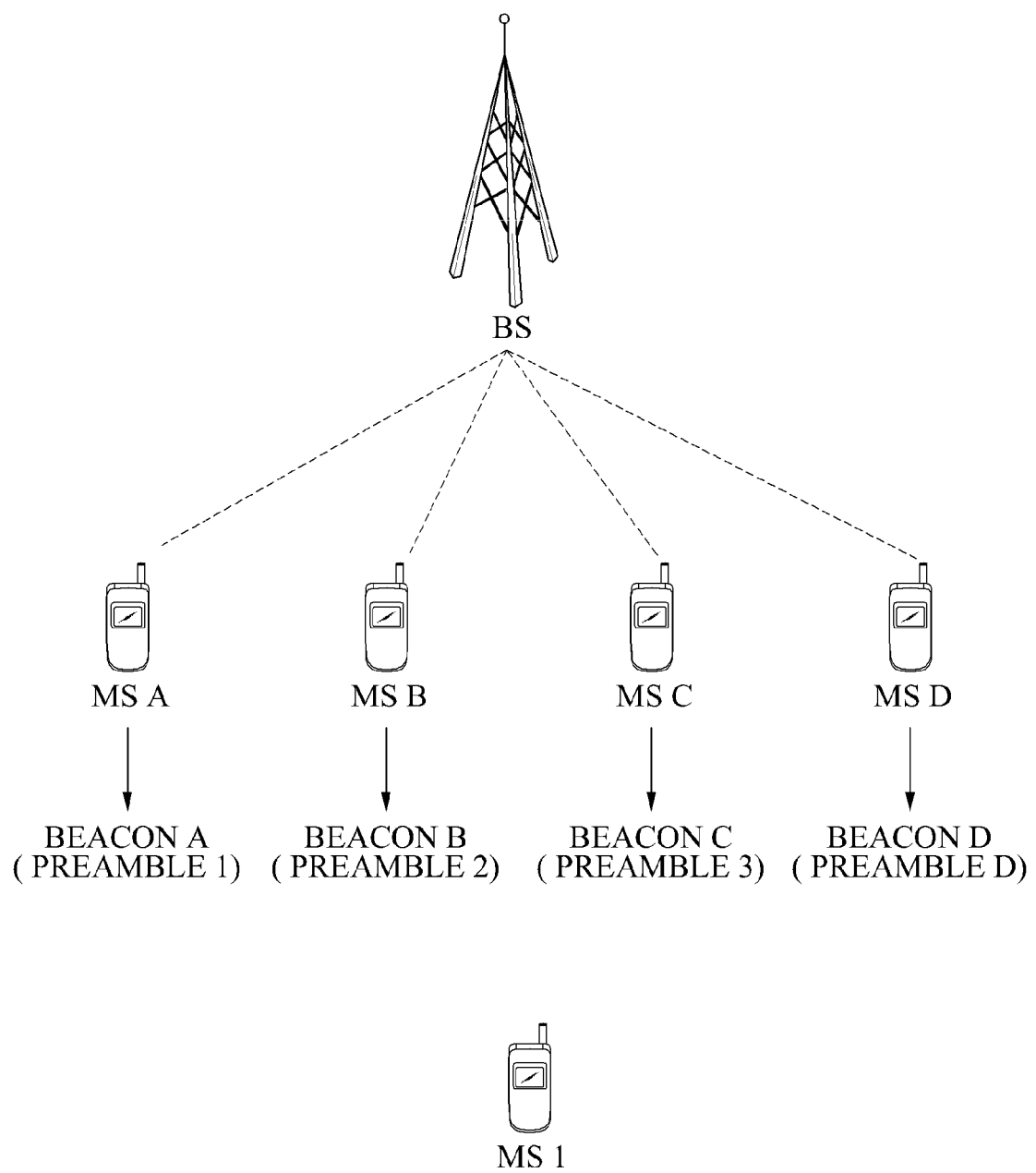
FIG. 3 is a diagram illustrating a cellular communication system which includes a plurality of relay terminals that broadcast beacons for grouping according to an exemplary embodiment.

FIG. 3 illustrates a cellular communication system which includes a plurality of relay terminals that broadcast beacons for grouping according to an exemplary embodiment.

Figure 4:
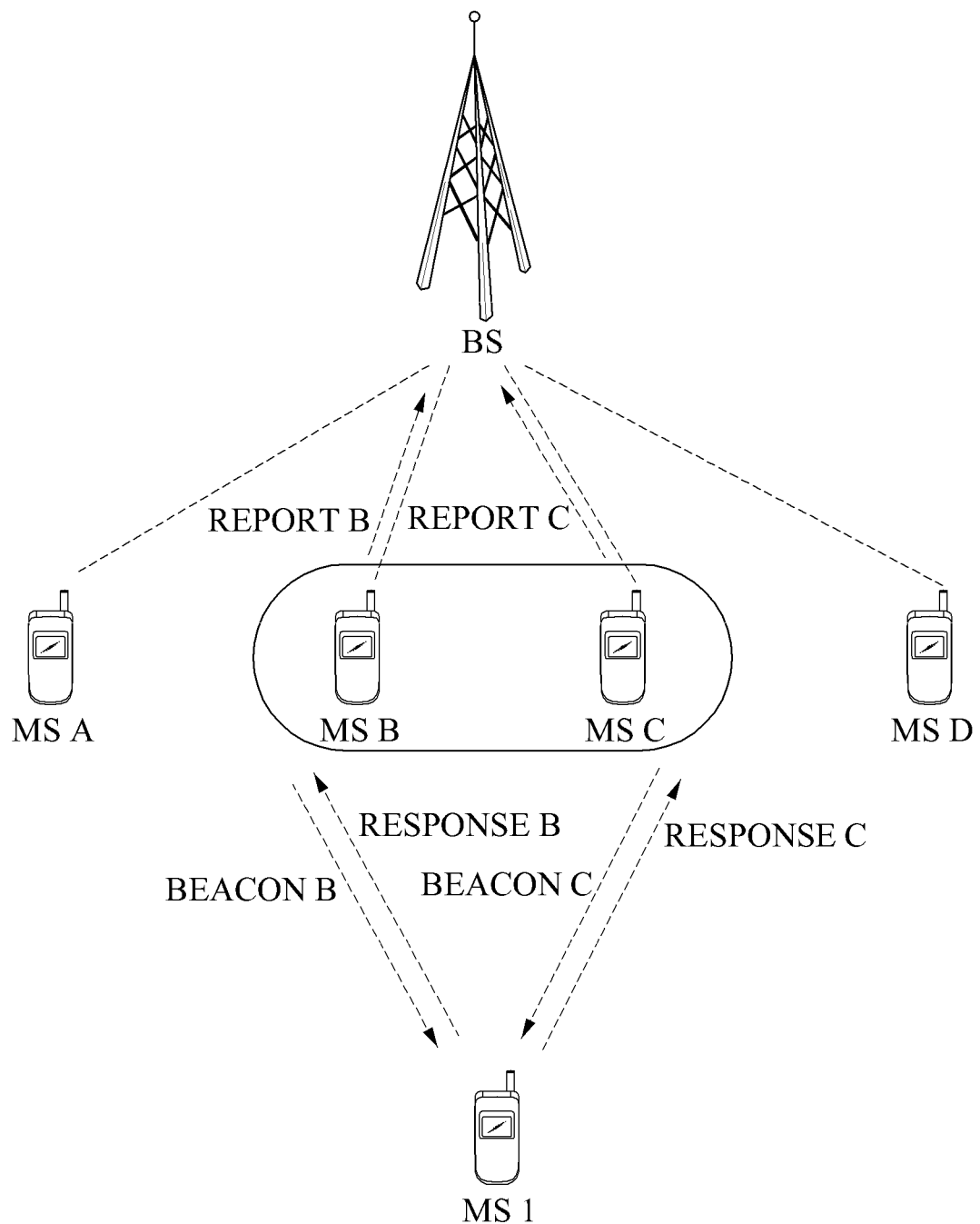
FIG. 4 is a diagram illustrating a conceptual process of grouping a portion of relay terminals from a plurality of relay terminals according to an exemplary embodiment.

FIG. 4 illustrates a conceptual process of grouping a portion of relay terminals from a plurality of relay terminals according to an exemplary embodiment.

Referring to FIG. 3, it is assumed that a target terminal 1 (MS 1) may not directly transmit/receive uplink/downlink data from a BS since the target terminal 1 (MS 1) is located far from the BS.

A plurality of relay terminals MS A, MS B, MS C, and MS D broadcast beacons A, B, C, and D which include identification information for each of a plurality of relay terminals MS A, MS B, MS C, and MS D, or beacons which include scheduling information. Beacons A, B, C, and D may be replaced by preambles. That is, the plurality of relay terminals MS A, MS B, MS C, and MS D broadcast beacons A, B, C, and D in order to report about existence of the plurality of relay terminals MS A, MS B, MS C, and MS D.

In the case target terminal 1 (MS 1) receives at least one beacon, the target terminal 1 (MS 1) may recognize a relay terminal corresponding to the received beacon, and connection may be established between the target terminal 1 (MS 1) and the recognized relay terminal.

Referring to FIG. 4, a target terminal 1 (MS 1) receives a beacon B from a relay terminal B (MS B). Also, the target terminal 1 (MS 1) transmits back a response B for the received beacon B to the relay terminal B (MS B). In this case, the relay terminal B (MS B) reports to the BS regarding the response B from the target terminal 1 (MS 1), via a report B. Accordingly, a connection is established between the relay terminal B (MS B) and the target terminal 1 (MS 1).

Also, a connection may be established between the target terminal 1 (MS 1) and a relay terminal C (MS C) using a beacon C, a response C and a report C. However, although not illustrated in FIG. 4, the target terminal 1 (MS 1) may inform that the relay terminal C (MS C) is closely located to the target terminal 1 (MS 1) via an already-established connection to the relay terminal B (MS B), and a connection between the relay terminal C (MS C) and the target terminal 1 (MS 1) may be established via the relay terminal B (MS B).

Accordingly, a group consisting of the relay terminal B (MS B) and relay terminal C (MS C) may be formed due to a connection between the relay terminal B (MS B) and target terminal 1 (MS 1) and a connection between the relay terminal C (MS C) and target terminal 1 (MS 1). As such, the target terminal 1 (MS 1) and the BS may transmit/receive uplink data/downlink data using the group consisting of the relay terminal B (MS B) and relay terminal C (MS C).

It is understood that members of the group may be updated. That is, new relay terminals may newly join the group, or relay terminals already included in the group may leave from the group.

Relay terminals may adaptively join the group according to 'relaying ability' capable of relaying uplink data/downlink data, and also may leave from the group. Here, the relaying ability may be assessed based on a number of the plurality of relay terminals, a moving speed, remaining power of the plurality of relay terminals, a traffic load to be placed on the plurality of relay terminals and channel states formed between the plurality of relay terminals and the base station or between the plurality of relay terminals and the target terminals.

As an example, even where the relay terminal B (MS B) is presently included in a group, the relay terminal B (MS B) may leave from the group due to low remaining power of the relay terminal B (MS B), due to a bad channel state formed between the relay terminal B (MS B) and the BS or between the relay terminal B (MS B) and the target terminal (MS 1), and/or due to insufficient relaying ability of the relay terminal B (MS B) caused by a large traffic load on the relay terminal B (MS B). In this case, even where the relay terminal B (MS B) leaves from the group, since relay terminal C (MS C) is still capable of performing as a relay terminal, data may be transmitted/received between the BS and the target terminal 1 (MS 1).

In an example of the contrasting case, even where a relay terminal A (MS A) is not presently included in a group, the relay terminal A (MS A) may newly join the group. For example relay terminal A (MS A) may newly join the group where a number of the terminals within the group is small, or where a relaying ability of the relay terminal A (MS A) is great.

Leaving from the group of the above described relay terminals MS A, MS B, MS C, and MS D or newly joining the group of relay terminals MS A, MS B, MS C, and MS D may be executed based on beacons transmitted from the relay terminals MS A, MS B, MS C, and MS D and responses of the target terminal 1 (MS 1) for the received beacons.

For relay terminals MS A, MS B, MS C, and MS D to join the group or leave from the group, the relay terminals MS A, MS B, MS C, and MS D may be required to send beacons periodically or aperiodically. Continuous transmission of beacons from the relay terminals MS A, MS B, MS C, and MS D may correspond to ineffective use of limited wireless resources of the relay terminals MS A, MS B, MS C, and MS D.

However, according to an exemplary embodiment, relay terminals MS A, MS B, MS C, and MS D may transmit beacons with adaptively controlled periods determined by their relaying ability. In this case, the relaying ability, as described above, may be assessed based on the number of relay terminals, the moving speed, the remaining electrical power of the relay terminals, traffic loads to be placed on the relay terminals, the channel state formed between the relay terminals and the BS or the channel state formed between the relay terminals and a target terminal(s).

As an example, where the relaying abilities of the relay terminals MS A, MS B, MS C, and MS D are high, relay terminals MS A, MS B, MS C, and MS D are not required to broadcast beacons unnecessarily often, and the wireless resource consumption of the relay terminals MS A, MS B, MS C, and MS D may be reduced by lengthening the transmission periods of the beacons. In the contrast, where the relaying ability of the relay terminals MS A, MS B, MS C, and MS D are low, relay terminals MS A, MS B, MS C, and MS D may broadcast beacons more frequently to improve the quality and reliability of a cellular communication system.

Figure 5:
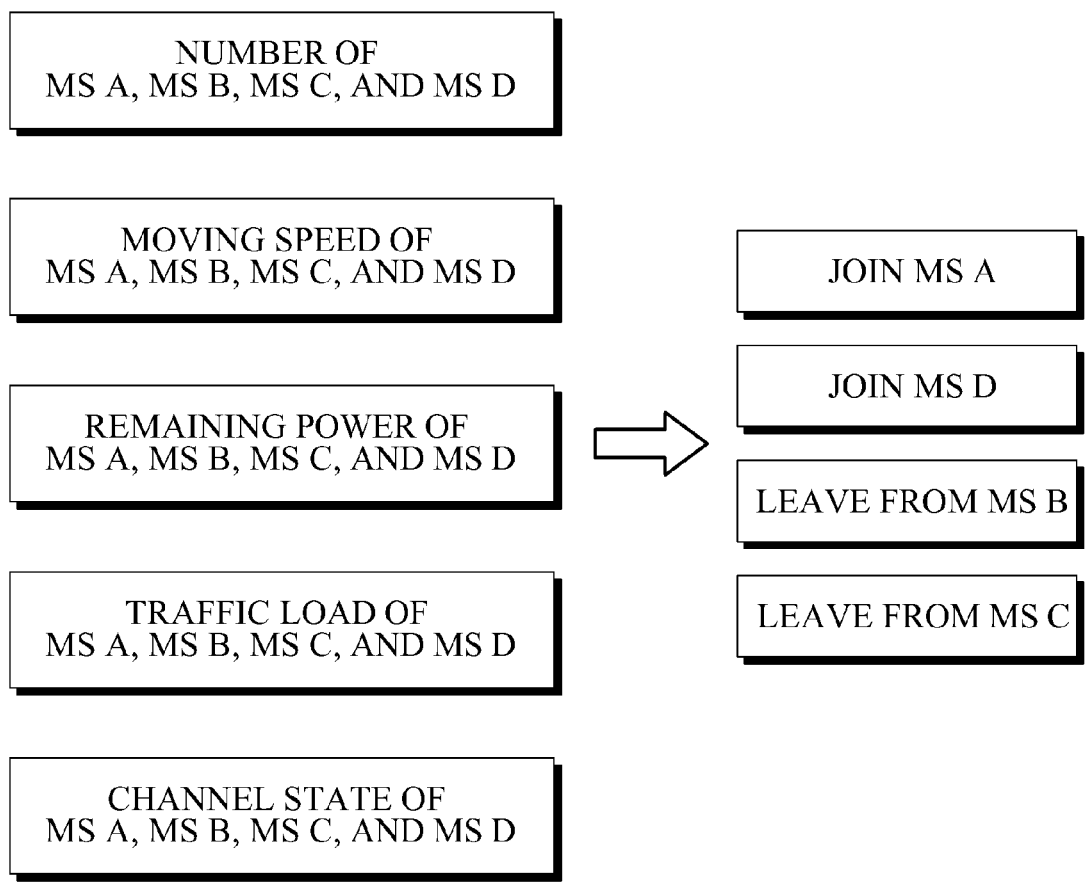
FIG. 5 is a conceptual diagram illustrating factors which may be considered in grouping a plurality of relay terminals, in updating a group, or in controlling a transmission period of beacons by a plurality of relay terminals according to an exemplary embodiment.

FIG. 5 illustrates factors which may be considered in grouping a plurality of relay terminals, in updating the group, or in controlling a transmission period of beacons by a plurality of relay terminals according to an exemplary embodiment.

In FIG. 5, a relay terminal B (MS B) and a relay terminal C (MS C) are presently included in a group, and a station A (MS A) and a relay terminal D (MS D) are not included in the group. According to various factors, the relay terminal B MS B and relay terminal C MS C leave from the group, and the relay terminal A MS A and the relay terminal D MS D join the group.

Although not explicitly illustrated in FIG. 5, transmission periods of beacons for relay terminals MS A, MS B, MS C, and MS D may be controlled by the factors illustrated in FIG. 5.

In the case where a number of the relay terminals MS A, MS B, MS C, and MS D is large, it may be assumed that the relaying ability is high. In such case, there is a high probability that remaining relay terminals normally perform as relay stations even where a portion of the relay terminals among the presently joined relaying stations leaves from the group. Also, in such case, transmission period of beacons of the relay terminals MS A, MS B, MS C, and MS D may be increased.

Where the moving speed of the relay terminals MS A, MS B, MS C, and MS D are high, it may be assumed that the relaying ability is low. In such case, there may be a need to prevent presently joined relay terminals from leaving from the group by. Also, in this case, it may be desirable for the relay terminals MS A, MS B, MS C, and MS D to transmit beacons with short periods.

Where the remaining electrical power of the relay terminals MS A, MS B, MS C, and MS D are low, where presently loaded traffic loads on the relay terminals MS A, MS B, MS C, and MS D are high, or where a channel state formed between each of the relay terminals MS A, MS B, MS C, and MS D and infra-stations is poor, it may be assumed that the relaying ability is low.

FIG. 6 illustrates operational modes with different timings for a plurality of relay terminals included in a single group according to an exemplary embodiment.

For illustration purpose only, FIG. 6 illustrates three exemplary embodiments, and it is understood that different implementations may be had from the exemplary embodiments of FIG. 6.

Referring to graphs 610, 620, and 630 of FIG. 6, it is assumed that a relay terminal B (MS B) and a relay terminal C (MS C) are included in a group to perform as relay stations. 'RS' in FIG. 6 represents that a relay terminal is operating in a 'relay station mode' whereas 'MS' represents that a relay terminal is operating in a 'mobile station mode' and performing original functionalities of the mobile station.

The graph 610 shows that the relay terminal B (MS B) and the relay terminal C (MS C) are scheduled to perform a 'relay station mode' and a 'mobile station mode' in the same time slot. In this case, the relay terminal B MS B and the relay terminal C MS C operate in a 'relay station mode' in the same time slot, thus the reliability or quality of uplink data/downlink data, relayed from the relay terminal B (MS B) and the relay terminal C (MS C), may be improved.

In graph 620, the relay terminal B (MS B) and the relay terminal C (MS C) operate in a 'relay station mode' in a different time slot. In this case, efficiency of wireless resources consumption may be enhanced.

In graph 630, the relay terminal B (MS B) and the relay terminal C (MS C) may operate in a 'relay station mode' both at the same time, or may operate in a 'relay terminal mode' at different time slots. In such case, the efficiency of the wireless resources usage may be slightly improved, the reliability or quality of uplink data and downlink data, relayed from the relay terminal B (MS B) and the relay terminal C (MS C) may be improved.

Figure 7:
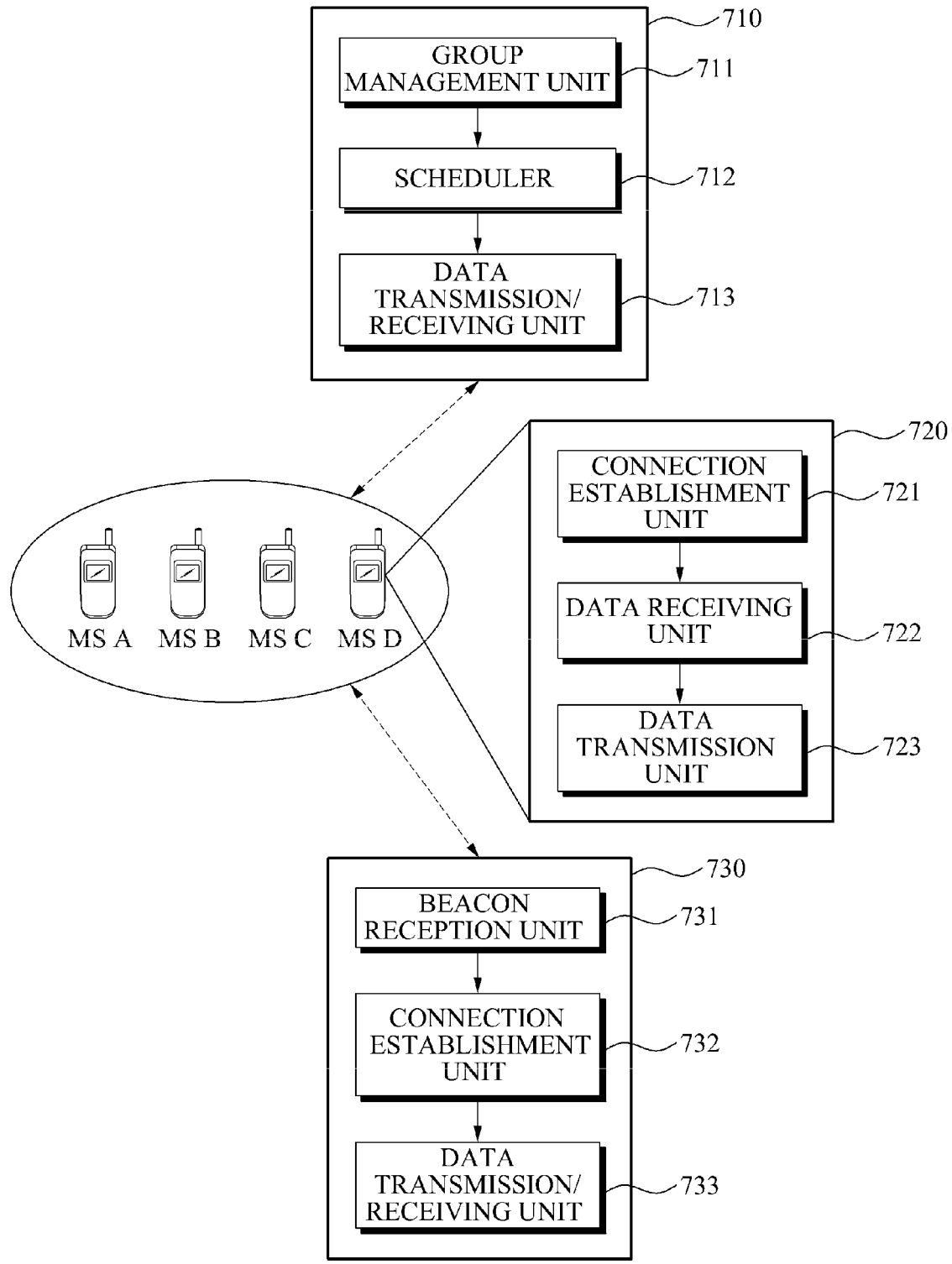
FIG. 7 is a block diagram illustrating a base station, a member relay terminal, and a target terminal according to an exemplary embodiment.

FIG. 7 illustrates a base station 710, a member relay terminal 720, and a target terminal 730 according to an exemplary embodiment.

Referring to FIG. 7, the base station 710 comprises a group management unit 711, a scheduler 712, and a data transmission unit/receiver 713. The relay terminal MS D 720, which is one of a plurality of relay terminals MS A, MS B, MS C, and MS D that are included in a group, comprises a connection establishment unit 721, a data receiving unit 722, and a data transmission unit 723. The target terminal 730 comprises a beacon reception unit 731, a connection establishment unit 732, and a data transmission/receiving unit 733.

The group management unit 711 in the base station 710 groups the plurality of relay terminals MS A, MS B, MS C, and MS D into at least one group, and manages the group. The group management unit 711 enables at least one of the plurality of relay terminals MS A, MS B, MS C, and MS D to leave from the group or enables a new relay terminal to join the group based on a relaying ability capable of relaying the uplink/downlink data.

The scheduler 712 is responsible for scheduling time slots or frequency bands for the above described plurality of relay terminals MS A, MS B, MS C, and MS D included in the group. The scheduler 712 is capable of controlling transmission periods of beacons, transmitted from the plurality of relay terminals MS A, MS B, MS C, and MS D using the relay abilities for the uplink data/downlink data.

The data transmission unit/receiver 713 is responsible for transmitting the downlink data from the plurality of relay terminals MS A, MS B, MS C, and MS D included in the group to the target terminal 730, and is also responsible for receiving the uplink data from the target terminal 730 to the plurality of relay terminals MS A, MS B, MS C, and MS D.

The connection establishment unit 721 of the member relay terminal 720 (MS D) transmits beacons indicating existence of the member relay terminal, and establishes a connection with the base station 710 or with the target terminal 730 based on a response from the base station or from the target terminal 730. The connection establishment unit 721 with a period which may be adaptively controlled depending on the relaying ability is capable of relaying the uplink data/the downlink data, and is also capable of transmitting the beacons.

The data receiving unit 722 receives the downlink data/ uplink data transmitted from the base station or from the target terminal 730.

The data transmission unit 723 cooperates with the plurality of relay terminals included in the group, and transmits the downlink data/the above uplink data to the base station or the target terminal 730. The data transmission unit 723 may transmit the uplink data/downlink data using either a scheduled time slot or a frequency band, and the time slot or the frequency band may be scheduled by the plurality of relay terminals. Additionally, the scheduled frequency band may be either a portion of or all of a cellular frequency band.

The member relay terminal 720 may adaptively join the group or leave from the group according to the relaying capability for the uplink data/the downlink data.

The beacon receiver 731 of the target terminal 730 receives beacons transmitted from the plurality of relay terminals.

The connection establishment unit 732, in response to the received beacons, establishes a connection with a portion of or all of the plurality of relay terminals. The connection establishment unit 732 may establish the connection with the portion of or all of the plurality of relay terminals based on identification information of the plurality of relay terminals.

The data transmission unit/receiving unit 733 may receive downlink data of a base station from the connection established relay terminals, or transmit uplink data to the connection established relay terminals.

Matters illustrated in and not described with reference to FIG. 7 may be the same as corresponding descriptions made with reference to FIGS. 1 through 6 and thus, are omitted herein.

A method for operating a base station according to an exemplary embodiment comprises grouping a plurality of relay terminal into at least one group and managing of the at least one group, scheduling either a time slot or a frequency band for the plurality of relay terminals included in the above group, and transmitting downlink data for a target terminal from the plurality of relay terminals included in the above group and receiving the uplink data transmitted from the plurality of relay terminals to the target terminal.

A method for operating a member relay terminal according to an exemplary embodiment comprises receiving downlink/ uplink data transmitted from a base station or a target terminal, cooperatively relaying the downlink/uplink data to the base station or to the target with the plurality of relay terminals of the group, transmitting beacons representing existence of the member relay terminal, and establishing a connection with the base station or with the target terminal depending on the response from the base station or the target terminal.

A method for operating a target terminal according to an exemplary embodiment comprises receiving beacons transmitted from the plurality of relay terminals, establishing a connection with a portion of all of the plurality of relay terminals in response to the received beacon, and receiving the downlink data of the base station from the connection established relay terminals or transmitting the uplink data to the connection established relay terminals.

A cellular communication system according to certain embodiments described above may extend cell coverage by utilizing terminals (relay terminals) which may perform as relay stations, and may effectively and economically improve performance of the cellular communication system by overcoming a shadow area.

In a cellular communication system, there may be problems arising from limitations such as in electrical power of a mobile station, a characteristic of mobility in a mobile station, limited traffic load granted for a mobile station, and the like.

A cellular communication system according to certain embodiments described above may solve one or more problems which may occur from mobile stations (relay terminals) performing as relay stations by adaptively grouping relay terminals based on the relaying ability of the relaying terminals.

A cellular communication system according to certain embodiments described above may conserve wireless resource consumption of relay terminals by effectively controlling a beacon transmitted from the relay terminals.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cellular communication system, the system comprising:
   a base station;
   a target terminal configured to transmit uplink data to the base station or receive downlink data from the base station; and
   a plurality of relay terminals configured to cooperatively relay the uplink data/downlink data to one base station/one target terminal, the plurality of relay terminals being grouped into at least one group,
   wherein the one base station is a single base station, and the one target terminal is a single target terminal, and
   wherein the plurality of relay terminals are adaptively grouped into at least one group based on at least one of a moving speed, and remaining power of the plurality of relay terminals.

2. The system of claim 1, wherein the plurality of relay terminals relay the uplink data/downlink data to/from the target terminal using a cellular frequency band.

3. The system of claim 1, wherein the plurality of relay terminals are adaptively grouped into at least one group based on a relaying ability capable of relaying the uplink data or the downlink data.

4. The system of claim 1, wherein the plurality of relay terminals are adaptively grouped into at least one group in further consideration of channel states formed between the plurality of relay terminals and the base station or between the plurality of relay terminals and the target terminals.

5. The system of claim 1, wherein the plurality of relay terminals relay the uplink data or the downlink data using scheduled time slots or frequency bands.

6. The system of claim 1, wherein the plurality of relay terminals transmit beacons representing existence of the plurality of relay terminals, and establishes connection with the base station or the target terminal depending on a response from the base station or the target terminal corresponding to the beacons.

7. The system of claim 6, wherein the plurality of relay terminals transmit the beacons with a period which are adaptively controlled depending on the relaying ability capable of relaying the uplink data/the downlink data.

8. The system of claim 6, wherein the beacons comprise identification information or scheduling information of the plurality of relay terminals.

9. The system of claim 1, wherein each of the plurality of relay terminals is configured to relay the uplink data/downlink data to the base station/target terminal.

10. The system of claim 1, wherein the base station cannot directly communicate with the target terminal due to distance away from each other.

11. The system of claim 6, wherein the beacons are preambles.

12. The system of claim 1, wherein wireless resources used by the plurality of relay terminals to relay uplink data/downlink data to/from the target terminal is scheduled by the plurality of relay terminals and the target terminal.

13. The system of claim 1, wherein the wireless resources include at least one of time resources, frequency resources, and code resources.

14. A member relay terminal included in a group which consists of a plurality of relay terminals, the member relay terminal comprising:
   a data receiving unit configured to receive downlink data/uplink data transmitted from a single base station of at least one base station/a single target terminal of at least one target terminal; and
   a data transmission unit configured to transmit the downlink data/uplink data to the single base station/target terminal in cooperation with the plurality of relay terminals included in the group,
   wherein the plurality of relay terminals are adaptively grouped into at least one group based on at least one of a moving speed, and remaining power of the plurality of relay terminals.

15. The member relay terminal of claim 14, wherein the member relay terminal adaptively joins the group or leaves from the group according to a relaying ability capable of relaying the uplink data or the downlink data.

16. The member relay terminal of claim 14, wherein the data transmission unit transmits the uplink data or the downlink data using scheduled time slots or frequency bands.

17. The member relay terminal of claim 16, wherein the time slots and the frequency bands are scheduled by the base station or the plurality of relay terminals.

18. The member relay terminal of claim 16, wherein the scheduled frequency bands are a portion of or all of a cellular frequency band.

19. The member relay terminal of claim 16, wherein the data transmission unit transmits the uplink data or the downlink data in a time slot, which is identical to a time slot of transmitting the uplink data or the downlink data by at least one of the plurality of relay terminals.

20. The member relay terminal of claim 14, further comprising:
   a connection establishment unit transmitting a beacon representing existence of the member relay terminal, and establishing connection with the base station/target terminal according to a response from the base station/target terminal corresponding to the beacon.

21. The member relay terminal of claim 20, wherein the connection establishment unit transmits the beacon with a period which is adaptively controlled depending on a relaying ability of the plurality of relay terminals or the member relay terminal capable of relaying the uplink data or the downlink data, and transmits the beacon.

22. A target terminal, comprising:
   a beacon reception unit configured to receive beacons transmitted from a plurality of relay terminals;
   a connection establishment unit configured to establish connection with a portion of or all of the plurality of relay terminals in response to the received beacons; and
   a data transmission/receiving unit configured to receive downlink data of a single base station of at least one base station from the connected relay terminals, or transmit uplink data to the connected relay terminals,
   wherein the target terminal is a single target terminal,
   wherein the connected relay terminals cooperatively relay the downlink data/uplink data, and
   wherein the plurality of relay terminals are adaptively grouped into at least one group based on at least one of a moving speed, and remaining power of the plurality of relay terminals.

23. The target terminal of claim 22, wherein the beacons comprises identification information of the plurality of the relay terminals, and the connection establishment unit establishes connection with a portion of or all of the plurality relay terminals based on the identification information of the plurality of relay terminals.

24. The target terminal of claim 22, wherein the beacons are transmitted from the plurality of relay terminals with a period which are adaptively controlled depending on a relaying ability capable of relaying the uplink data/downlink data of the plurality of relay terminals.

25. The target terminal of claim 22, wherein the data transmission/receiving unit receives the downlink data from the connected relay terminals or transmits the uplink data to the connected relay terminals, using a cellular frequency band.

26. A base station, comprising:
   a group management unit configured to group a plurality of relay terminals, and manage the group;
   a scheduler configured to schedule time slots or frequency bands for the plurality of relay terminals included in the group; and
   a data transmission/receiving unit configured to transmit downlink data for a single target terminal of at least one target terminal to the plurality of relay terminals included in the group, or receive uplink data transmitted by the single target terminal from the plurality of relay terminals,
   wherein the base station is a single base station,
   wherein the plurality of relay terminals included in the group relay the downlink data/uplink data using the scheduled time slots or the frequency bands, and
   wherein the group management unit configured to group into at least one group based on at least one of a moving speed, and remaining power of the plurality of relay terminals.

27. The base station of claim 26, wherein the group management unit enables at least one of the plurality of relay terminals to leave from the group, or enables a new relay terminal to join the group, based on a relaying ability capable of relaying the uplink data/downlink data.

28. The base station of claim 26, wherein the plurality of relay terminals included in the group establishes connection with the base station or the target terminal using beacons representing existence of the plurality of relay terminals, and the scheduler controls a transmission period of the beacons according to the relaying ability capable of relaying the uplink data or the downlink data.

* * * * *